Dec. 25, 1951  C. GARBER  2,580,087
SAFETY PIN
Filed July 12, 1950  3 Sheets-Sheet 1
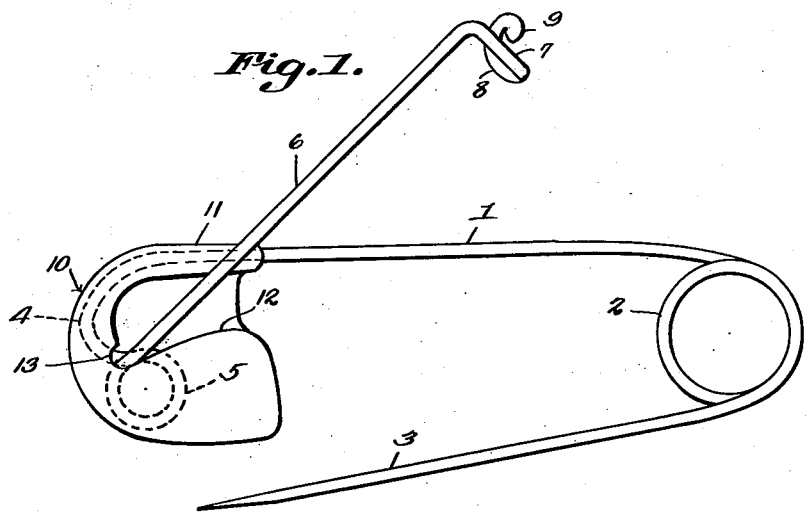
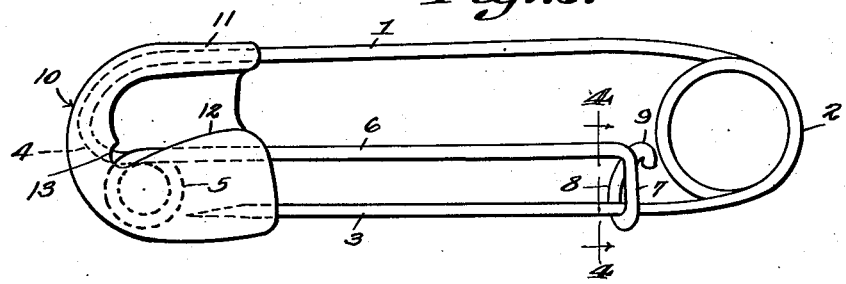
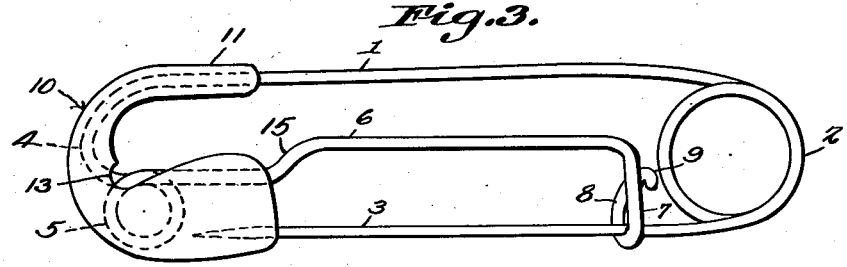
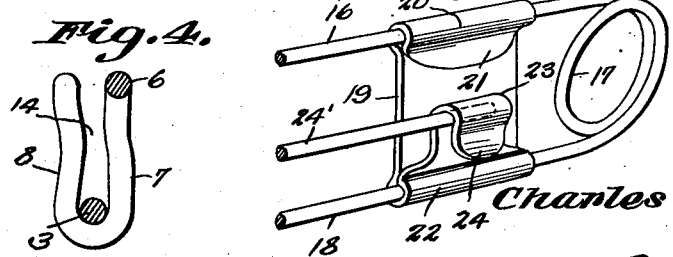
Charles Garber
INVENTOR
BY C.A.Snow&Co.
ATTORNEYS.

Dec. 25, 1951  C. GARBER  2,580,087
SAFETY PIN
Filed July 12, 1950  3 Sheets-Sheet 2
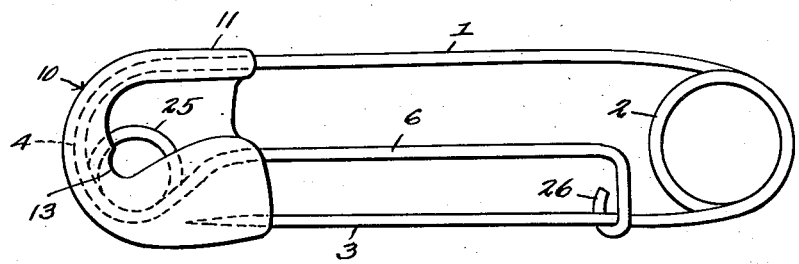
Fig. 6.
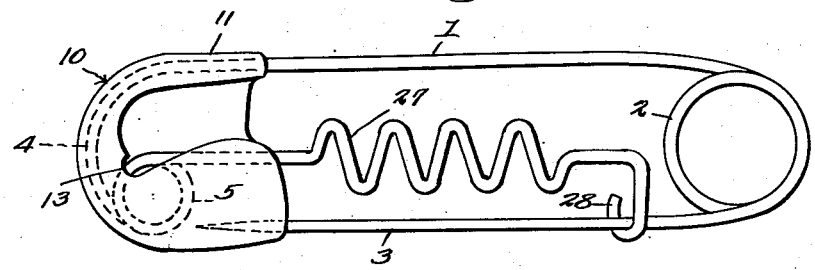
Fig. 7.
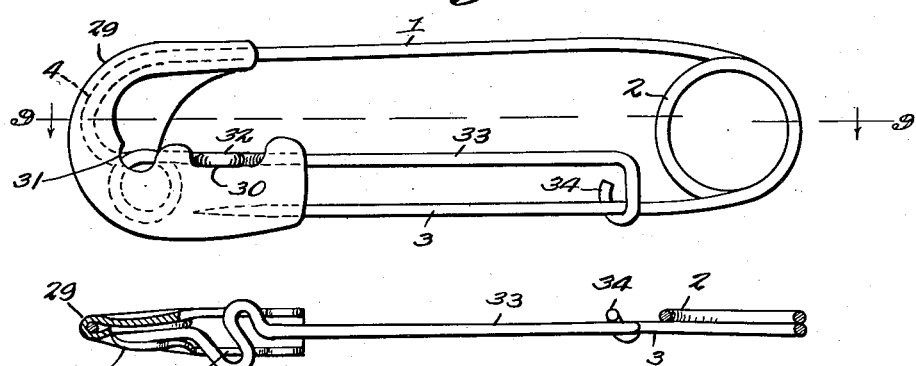
Fig. 8.
Fig. 9.
Charles Garber
INVENTOR
BY *CA Snow Leo.*
ATTORNEYS.

Dec. 25, 1951    C. GARBER    2,580,087
SAFETY PIN
Filed July 12, 1950    3 Sheets-Sheet 3
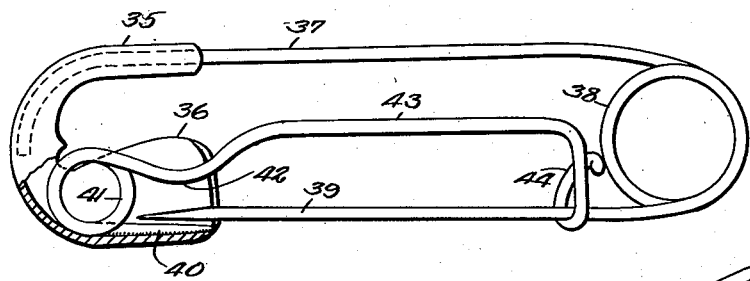
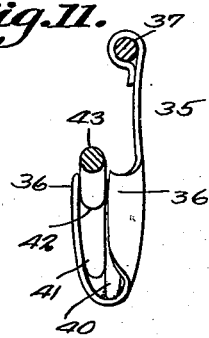
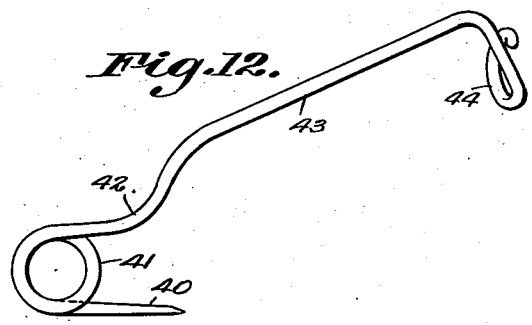
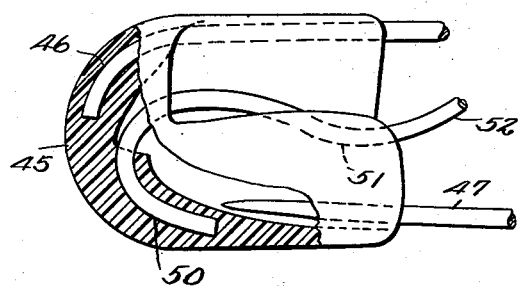
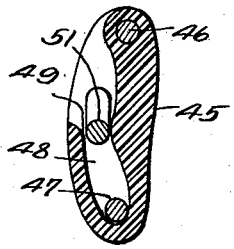
Charles Garber
INVENTOR
BY CA Snow &Co.
ATTORNEYS.

Patented Dec. 25, 1951

2,580,087

UNITED STATES PATENT OFFICE 2,580,087

SAFETY PIN

Charles Garber, Providence, R. I.

Application July 12, 1950, Serial No. 173,351

5 Claims. (Cl. 24—156)

1

This invention relates to a safety pin construction, and more particularly, has reference to a safety pin in which is embodied a novelly formed locking means adapted to prevent accidental opening of the pin.

The dangers attendant upon an accidental opening of a closed safety pin are well known, and not infrequently, a safety pin weakens somewhat from long usage and placed under a strain by reason of pinning an excessive bulk of material, will open and may penetrate the wearer's skin, with painful and even dangerous results.

Accordingly, an important object of the present invention is to provide a safety pin construction in which is embodied a locking means which will add to the manufacturing cost of the safety pin only to a minor extent, but which will be fully efficient in preventing accidental opening of the pin even where a thick bulk is pinned thereby.

Still another important object is to provide a safety pin construction wherein said locking means may be formed either integrally with the wire from which the pin itself is formed, or as a separate piece applicable to conventional safety pin construction.

Still another important object is to provide a safety pin construction wherein said locking means cannot itself accidentally disengage from the locked pin stem.

Yet another object is to provide a safety pin construction wherein a pin stem and a locking stem are each formed with a spring at one end, each being controlled by a different one of said springs so as to inter-engage, with the spring action tending to bias one of said stems oppositely to the other.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings

Fig. 1 is an elevation of one form of the invention, the pin being open.

Fig. 2 is a view similar to Fig. 1 in which the pin is closed and the locking means engaged.

Fig. 3 is a view similar to Fig. 2 showing a modified form.

Fig. 4 is an enlarged section on line 4—4 of Fig. 2.

Fig. 5 is a fragmentary perspective view of one end of another modified form.

2

Fig. 6 is a view similar to Fig. 2 of another modified form.

Fig. 7 is a view similar to Fig. 2 of another modified form.

Fig. 8 is a view similar to Fig. 2 of another modified form.

Fig. 9 is a section on line 9—9 of Fig. 8.

Fig. 10 is a view partly in side elevation and partly in longitudinal section of another modified form wherein the invention is applied to a conventional safety pin.

Fig. 11 is a transverse section through the form of Fig. 10 looking in the direction of the head of the pin.

Fig. 12 is a side elevational view of the locking stem of the form of Fig. 10.

Fig. 13 is a view partly in side elevation and partly in longitudinal section through the head portion of another modified form, wherein the head is formed of molded plastic material.

Fig. 14 is a transverse section through the form of Fig. 13.

Referring to the drawings in detail, considering first the form of the invention as seen in Figs. 1 and 2, I provide a safety pin including a back piece 1 of wire material which at the foot end of the pin merges into the spring coil 2, which in turn is integral with the pin stem 3. At the head end of the pin the back piece 1 has a return bend 4, merging into the coil 5 reversed relative to the coil 2, the spring coil 5 in turn merging into the locking stem 6 which at its free end is extended laterally at 7 and then is extended back toward the locking stem as at 8 and folded over at 9 to provide a rounded end. The portions 7, 8, 9, as will be appreciated define a keeper on the free end of said locking stem.

All the parts so far described, as readily seen, are formed from a single piece of wire material, having at one end a pin stem and at the other end a locking stem with a keeper, said length of wire material having intermediate its ends the spaced apart spring coils, one of which biases the locking stem and the other of which biases the pin stem.

This length of wire material is enclosed at the head end of the pin in a main keeper generally designated 10 one side of which is formed with the rolled edge 11 receiving the back piece 1, the other side being formed with the lip 12 to provide the keeper receiving the pin stem 3. The edge of the lip 12, at one end of the lip, is indented at 13 to permit a certain amount of lateral movement of the locking stem 6 when the locking stem is in the open position seen in Fig. 1, thus to permit the pin stem 3 to have clear entry into the keeper 12.

In use, it will be seen that the pin is first in the position seen in Fig. 1, after which the material to be pinned is impaled by the pin stem 3, the pin stem 3 then being entered into the keeper 12, after which the locking stem 6 is swung downwardly against the action of the spring coil 5 so as to swing under and then upwardly into engagement with the pin stem 3 in the manner seen in Fig. 2, wherein the locking keeper at the free end of the locking stem receives the base portion of the pin stem 3. It will be noted that the biasing action of the spring coils 2 and 5 is in direct opposition, the spring coil 2 tending to bias the pin stem 3 downwardly, while the spring coil 5 tends to bias the locking stem 6 upwardly. As a result a tight engagement between the pin stem and locking stem is provided, in a manner to prevent the pin stem from becoming accidentally disengaged from the locking keeper. At the same time the locking stem 6 enters partially into the keeper so as to close the throat thereof, thus to prevent the pin stem 3 from accidentally springing out of said main keeper.

In Fig. 4 it is seen that the portions 7, 8, of the locking keeper are bent inwardly toward each other to a slight extent so as to provide a restricted throat 14 through which the pin stem 3 moves in being received in the locking keeper. This restricted throat 14 is of a width slightly less than the diameter of the pin stem so that the pin stem must force the portions 7, 8 apart for entry into or removal from said locking keeper. This further secures the locking action.

Considering now the form of the invention as seen in Fig. 3, in this figure it is to be noted that the safety pin is formed almost like the first form of the invention, with the exception that there is a shallow S bend 15 in the locking stem, this compound bend being for the purpose of spacing the locking stem 6 and pin stem 3 a substantially greater distance apart than in the first form of the invention, thus to permit a greater bulk of material to be pinned.

In Fig. 5 is seen another modified form in which the back piece 16 is formed at the foot end of the pin with a spring coil 17, the spring coil merging into the pin stem 18. The head end of the pin has not been illustrated in Fig. 5 but will be like that of Figs. 1 and 2, so as to provide a spring coil at said head end biasing a locking stem oppositely to the movement of the pin stem 18.

In the form of the invention seen in Fig. 5 there is mounted on the length of wire material, adjacent the spring coil at the foot end of the pin, a transversely extended plate 19 one end of which is rolled at 20 to receive the back piece 16, the rolled edge having the lip 21. The other end portion of said plate 19 is rolled at 22 to receive the pin stem 18, and is formed with a keeper 23 having the lip 24, the keeper 23 receiving the locking stem 24'. The plate 19 and keeper formed thereon provides inter-engaging means between the free end of the locking stem and the base end of the pin stem, as in the first forms described.

Considering now the form of the invention seen in Fig. 6, the pin here illustrated is identical to the form seen in Figs. 1 and 2, with the exception that the spring coil 25 is reversed from the direction in which the coil 5 extends. The only other difference is in the form of the locking keeper, the locking keeper 26 simply being a hook formation on the free end of said locking stem.

The action is, however, the same, the spring coil 25 biasing the locking stem in the same direction as the spring coil 5 of the first form of the invention.

In Fig. 7 is illustrated a modified form in which the only change from the form seen in Figs. 1 and 2 resides in the particular formation of the locking stem. In this form of the invention the locking stem 27 is of waved or corrugated formation, so as to engage the pinned material and assist in holding said material in place. The free end of the locking stem 27 is provided with a keeper 28 similar to the keeper 26.

In Fig. 8 is illustrated a modified form in which the head 29 of the pin is provided with a main keeper, the edge of which is indented as at 30, there being adjacent said indentation or notch 30 the indentation 31 corresponding to the indentation 13 in earlier forms of the invention.

The form seen in Fig. 8 has a locking stem which adjacent its base end is provided with a goose neck 32 lying across the notches 30 of the main keeper, said goose neck 32 merging into the locking stem 33 having at its free end the keeper 34 engaging the pin stem 3. The goose neck 32 closes effectively the throat of the main keeper so as to provent accidental movement of the pin stem out of said main keeper.

It will be seen that in all forms of the invention so far described, there is in common the construction wherein the length of wire material is integrally formed with a locking stem and a pin stem at its oposite ends, said locking stem and pin stem being extended in substantial parallelism from opposite ends of the pin, in opposite directions, said length of wire material being further formed with the spring coils at opposite ends of the pin, each spring coil biasing the locking stem or pin stem, as the case may be, in opposite directions so as to prevent accidental opening of the pin.

In the form of the invention as seen in Fig. 10, the invention has been applied to a conventionally formed safety pin having the head 35, one side of which is formed with the spaced wings 36. In the other side of the head there is crimped or otherwise fixedly secured one end of the shank 37 of the pin, merging at the opposite end of the pin into a spring loop 38 which in turn merges into the pin stem 39 adapted to be biased by the spring action into the space between the wings 36.

This is, so far, a fully conventional safety pin construction. In accordance with the present invention, however, I fixedly secure, by soldering or by any other suitable means, one end 40 of the locking member seen in Fig. 12, to the head 35 between the wings 36. The end 40 merges into a spring loop 41 also disposed between said wings, which in turn merges into a goose neck portion 42 extending through the throat defined as an entranceway between the wings 36, this in turn being integral with the elongated locking stem 43 overlying the pin stem 39, the locking stem 43 being formed at its free end with a locking loop or hook 44 receiving the base portion of the pin stem 39. The spring 41 tends to bias the pin stem 43 upwardly, so as to cause the locking hook 44 to tightly engage the pin stem 39, which is in turn biased downwardly in Fig. 10 by its spring 38.

In this connection, the only change made in the thoroughly conventional safety pin construction illustrated is to press one of the wings 36 laterally toward the other wing as shown in Fig. 11, so as to narrow substantially the space between said wings to a width only slightly greater than the diameter of the locking stem. As a result, when the parts are engaged as in Fig. 10, the locking stem fills the throat or entranceway between the wings 36 so as to prevent in a positive manner the possibility of accidental movement of the pointed pin stem 39 from the space between the wings.

When it is desired to open the pin, the user simply releases hook 44 from its engagement with the pin stem, as a result of which the spring 41 will bias the locking stem 43 upwardly as in Fig. 12, thus to clear the throat between wings 36 and permit removal of the pin stem 39.

In Fig. 13 there is illustrated another modified form wherein the pin is formed with a plastic head 45 in one side portion of which is embedded one end of the pin shank 46. The construction of the pin at the opposite end is the same as in Fig. 10, the pin shank merging into a spring loop which in turn merges into and exerts spring action against the pin stem 47, receivable in the molded recess 48 having the narrowed throat 49. Embedded in the head 45 is one end 50 of the locking member, this being formed as part of a U-shaped spring which is the equivalent of the full spring loop seen in the other forms of the invention. The spring merges into the goose neck 51 disposed in the throat 49 in the locked position of the locking member and clearing said throat in the unlocked position, said goose neck 51 merging into the locking stem 52. The other end of the locking stem is not illustrated but will be the same as the first forms of the invention.

What is claimed is:

1. A safety pin construction comprising a length of wire material integrally formed at opposite ends with a locking stem and pin stem, and spring coils formed in said length of wire material and biasing said locking stem and a pin stem in opposite directions, the locking stem including means interengaging with the pin stem to prevent accidental opening of the safety pin.

2. A safety pin construction comprising a head including a main keeper, and a length of spring wire material including a back piece, spring coils at opposite ends of said back piece, and a locking stem and a pin stem at its opposite ends, one of said spring coils biasing the locking stem and the other spring coil biasing the pin stem, said locking stem including a means inter-engaging releasably with the pin stem in one position of the pin stem and locking stem, said pin stem being received in the main keeper in said position.

3. A safety pin construction comprising a head including a main keeper, and a length of wire material integrally formed with a back piece secured at one end within the head, said back piece being integral at opposite ends with spring coils, said spring coils being integral with a locking stem and a pin stem respectively, the free end of the pin stem being receivable in the main keeper, the locking stem inter-engaging with the base end of the pin stem and adapted when so interengaged to close said main keeper to prevent accidental movement of the pin stem out of said main keeper.

4. A safety pin construction comprising a head having a keeper, a back piece extending from said head, a spring coil at one end of the back piece, and a pin stem integral with said spring coil and back piece and being receivable in said keeper, and a locking stem extending from the head and engageable with the pin stem to prevent accidental movement of the pin stem out of said keeper.

5. A safety pin construction comprising a head including a main keeper, a length of spring wire material secured to the head and including a spring loop spaced from the head and a pin stem normally biased by and integral with said loop, said pin stem being adapted to extend into the keeper, and a locking member secured to said head and including a locking stem extending from the head, a spring integral with said locking stem and biasing the locking stem in a direction opposite to the direction in which the pin stem is biased, a locking hook on the locking stem adapted to releasably engage the pin stem, a portion of said locking stem extending through the keeper when the hook is engaged with the pin stem, to prevent accidental removal of the pin stem from the keeper.

CHARLES GARBER.

REFERENCES CITED

The following references are of record in the file of this patent:

UNITED STATES PATENTS

| Number | Name | Date |
| --- | --- | --- |
| 958,311 | Reed | May 17, 1910 |
| 1,038,202 | Reynolds | Sept. 10, 1912 |
| 2,089,576 | Rosenquist | Aug. 10, 1937 |

FOREIGN PATENTS

| Number | Country | Date |
| --- | --- | --- |
| 131,853 | Great Britain | of 1919 |